US012683639B2

(12) United States Patent
Cho et al.

(10) Patent No.: US 12,683,639 B2
(45) Date of Patent: ***Jul. 14, 2026

(54) ANTENNA SWITCH FOR TIME DIVISION DUPLEXING AND FREQUENCY DIVISION DUPLEXING

(71) Applicant: Skyworks Solutions, Inc., Irvine, CA (US)

(72) Inventors: Joshua Haeseok Cho, Irvine, CA (US); Stephane Richard Marie Wloczysiak, Irvine, CA (US); Thomas Obkircher, Santa Ana, CA (US); Junhyung Lee, Irvine, CA (US); Rimal Deep Singh, Irvine, CA (US); Bipul Agarwal, Irvine, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 351 days.

This patent is subject to a terminal disclaimer.

(21) Appl. No.: 18/453,205

(22) Filed: Aug. 21, 2023

(65) Prior Publication Data

US 2024/0048167 A1 Feb. 8, 2024

Related U.S. Application Data

(63) Continuation of application No. 17/649,904, filed on Feb. 3, 2022, now Pat. No. 11,777,549.

(Continued)

(51) Int. Cl.
H04B 1/16 (2006.01)
H04B 1/18 (2006.01)
(Continued)

(52) U.S. Cl.
CPC ......... H04B 1/1638 (2013.01); H04B 1/1615 (2013.01); H04B 1/18 (2013.01); H04J 4/00 (2013.01); H04L 5/14 (2013.01)

(58) Field of Classification Search
CPC ......... H04L 5/14; H04L 5/001; H04L 5/1469; H04L 5/143; H04L 5/16; H04L 5/0023; H04L 5/003; H04L 5/0048; H04L 5/0053; H04L 5/1423; H04L 5/1461; H04L 27/2647; H04L 5/0044; H04L 5/0037; H04L 5/0098; H04L 1/1812; H04L 1/1854; H04L 5/0028; H04L 5/0055; H04L 5/006;
(Continued)

(56) References Cited

U.S. PATENT DOCUMENTS 7,433,390 B2 10/2008 Helper et al.
7,706,452 B2 4/2010 Fujita et al.
(Continued)

*Primary Examiner* — Golam Sorowar
(74) *Attorney, Agent, or Firm* — VIA LLP

(57) ABSTRACT

Radio frequency front end modules implementing coexisting time division duplexing and frequency division duplexing are provided. In one aspect, a front end system includes a time-division duplexing transmit terminal, a time-division duplexing receive terminal, a frequency division duplexing terminal, and an antenna terminal. The front end system further includes first, second, and third switches configured to selectively connect the terminals to either a node or the antenna. The front end system also includes a controller configured to provide delays between disconnecting the terminals from the antenna and connecting the terminals to the node.

20 Claims, 11 Drawing Sheets

Related U.S. Application Data

(60) Provisional application No. 63/145,692, filed on Feb. 4, 2021.

(51) Int. Cl.
*H04J 4/00* (2006.01)
*H04L 5/14* (2006.01)

(58) Field of Classification Search
CPC .. H04B 7/15535; H04B 1/005; H04B 7/0617; H04B 7/15557; H04B 7/15542; H04B 17/318; H04B 17/336; H04B 17/40; H04B 7/1555; H04B 1/0057; H04B 1/406; H04B 1/525; H04B 2001/0408; H04B 1/0064; H04B 1/52; H04W 72/0453; H04W 52/52; H04W 52/16; H04W 52/243; H04W 52/46; H04W 72/23; H04W 72/0446; H04W 88/06; H04W 16/26; H04W 52/0216; H04W 52/241; H04W 56/0005; H04W 72/1268; H04W 76/28

See application file for complete search history.

(56) References Cited

U.S. PATENT DOCUMENTS

| | | | | |
|---|---|---|---|---|
| 7,715,871 | B2 | 5/2010 | Duan | |
| 8,160,522 | B2 | 4/2012 | Lee et al. | |
| 9,608,689 | B2 | 3/2017 | Dayal et al. | |
| 9,698,857 | B1 * | 7/2017 | Lee | H01Q 5/00 |
| 10,477,550 | B2 * | 11/2019 | Balteanu | H04L 5/1469 |
| 11,626,893 | B2 * | 4/2023 | Eller | H04B 1/0475 |
| | | | | 455/114.1 |
| 11,777,549 | B2 | 10/2023 | Cho et al. | |
| 12,132,509 | B2 * | 10/2024 | Loh | H04B 1/0064 |
| 12,309,762 | B2 * | 5/2025 | Svedman | H04L 5/0023 |

| | | | | |
|---|---|---|---|---|
| 2002/0090974 | A1 * | 7/2002 | Hagn | H04B 1/48 |
| | | | | 455/552.1 |
| 2007/0254692 | A1 * | 11/2007 | McCoy | H04W 52/0261 |
| | | | | 455/553.1 |
| 2016/0134414 | A1 | 5/2016 | Pehlke | |
| 2016/0218767 | A1 * | 7/2016 | Li | H04L 5/26 |
| 2016/0323080 | A1 * | 11/2016 | Khlat | H04B 1/38 |
| 2018/0048345 | A1 | 2/2018 | Pehlke et al. | |
| 2018/0063031 | A1 | 3/2018 | Wloczysiak et al. | |
| 2018/0205530 | A1 | 7/2018 | Pehlke | |
| 2018/0260358 | A1 | 9/2018 | Obkircher et al. | |
| 2019/0013836 | A1 | 1/2019 | Pehlke et al. | |
| 2019/0230051 | A1 | 7/2019 | Wloczysiak et al. | |
| 2019/0273314 | A1 | 9/2019 | Wloczysiak | |
| 2020/0036406 | A1 | 1/2020 | Pehlke et al. | |
| 2020/0057746 | A1 | 2/2020 | Obkircher et al. | |
| 2020/0244597 | A1 | 7/2020 | Wloczysiak et al. | |
| 2021/0044278 | A1 | 2/2021 | Kankar et al. | |
| 2021/0105005 | A1 | 4/2021 | Kankar et al. | |
| 2021/0105006 | A1 | 4/2021 | Kankar et al. | |
| 2021/0173807 | A1 | 6/2021 | Obkircher et al. | |
| 2021/0184346 | A1 | 6/2021 | Wloczysiak | |
| 2021/0210415 | A1 | 7/2021 | Liu et al. | |
| 2021/0210429 | A1 | 7/2021 | Liu et al. | |
| 2021/0211107 | A1 | 7/2021 | Liu et al. | |
| 2021/0218422 | A1 | 7/2021 | Pehlke | |
| 2021/0218424 | A1 | 7/2021 | Pehlke | |
| 2021/0218433 | A1 | 7/2021 | Liang et al. | |
| 2022/0038119 | A1 * | 2/2022 | Lim | H04B 1/04 |
| 2022/0038392 | A1 | 2/2022 | Wloczysiak et al. | |
| 2022/0182084 | A1 | 6/2022 | King et al. | |
| 2022/0182085 | A1 | 6/2022 | King et al. | |
| 2022/0278707 | A1 | 9/2022 | Liang et al. | |
| 2022/0329266 | A1 | 10/2022 | Pehlke | |
| 2022/0413533 | A1 | 12/2022 | Liang et al. | |
| 2022/0413534 | A1 | 12/2022 | Liang et al. | |
| 2023/0012894 | A1 | 1/2023 | Liang et al. | |
| 2023/0014555 | A1 | 1/2023 | Liang et al. | |
| 2023/0030709 | A1 | 2/2023 | Hageraats et al. | |
| 2023/0038733 | A1 | 2/2023 | Blin et al. | |

* cited by examiner

Control_in ●─//─    PROGRAMMABLE
                    RC DELAY CIRCUIT
                    500              ─//─● Control_out

ANTENNA SWITCH FOR TIME DIVISION DUPLEXING AND FREQUENCY DIVISION DUPLEXING

CROSS-REFERENCE TO RELATED APPLICATION(S)

This application is a continuation of U.S. Non-Provisional application Ser. No. 17/649,904, filed Feb. 3, 2022, which claims the benefit of U.S. Provisional Application No. 63/145,692, filed Feb. 4, 2021. Each of the foregoing applications are hereby incorporated by reference in their entirety. Any and all applications for which a foreign or domestic priority claim is identified in the Application Data Sheet as filed with the present application are hereby incorporated by reference under 37 CFR 1.57.

BACKGROUND

Technological Field

Aspects of this disclosure relate to radio frequency (RF) communication systems, and in particular, front end modules for use in RF communication systems.

Description of the Related Technology

RF communication systems include a front end module which couples one or more antennas to transmit and receive paths that communicate the RF signals to/from a baseband system. Front end modules can be configured to communicate using both time-division duplexing (TDD) and frequency division duplexing (FDD) communication. In implementing 5G, the front end module may need to selectively connect a relatively large number of bands to a limited number of antennas. Such front end modules may also implement many carrier aggregation cases for the diversity receive path.

SUMMARY OF CERTAIN INVENTIVE ASPECTS

The systems, methods and devices of this disclosure each have several innovative aspects, no single one of which is solely responsible for the desirable attributes disclosed herein.

In one aspect, there is provided a front end system comprising: a time-division duplexing transmit terminal; a time-division duplexing receive terminal; a frequency division duplexing terminal; an antenna terminal; a first switch configured to selectively connect the time-division duplexing transmit terminal to either a first node or the antenna based on a first control signal; a second switch configured to selectively connect the time-division duplexing receive terminal to either a second node or the antenna based on a second control signal; a third switch configured to connect the frequency division duplexing terminal to the antenna based on a third control signal; and a controller configured to generate the first, second, and third control signals, the controller further configured to provide: i) a first delay between disconnecting the time-division duplexing transmit terminal from the antenna and connecting the time-division duplexing transmit terminal to the first node, and ii) a second delay between disconnecting the time-division duplexing receiver terminal from the antenna and connecting the time-division duplexing receive terminal to the second node.

The first node and the second node can be ground nodes.

The first switch can include a first serial sub-switch configured to selectively connect the time-division duplexing transmit terminal to the antenna and a first shunt sub-switch configured to selectively connect the time-division duplexing transmit terminal to the first node, and the second switch can include a second serial sub-switch configured to selectively connect the time-division duplexing receive terminal to the antenna and a second shunt sub-switch configured to selectively connect the time-division duplexing receive terminal to the second node.

The first control signal can include a first serial control signal configured to control the first serial sub-switch and a first shunt control signal configured to control the first shunt sub-switch, and the second control signal can include a second serial control signal configured to control the second serial sub-switch and a second shunt control signal configured to control the second shunt sub-switch.

The controller can be further configured to provide the first delay between transitioning the first serial control signal to an off value and transitioning the first shunt control signal to an on value, and the controller can be further configured to provide the second delay between transitioning the second serial control signal to the off value and transitioning the second shunt control signal to the on value.

The controller can be further configured to provide a third delay between transitioning the first shunt control signal to the off value and transitioning the first serial control signal to the on value, and the controller can be further configured to provide a fourth delay between transitioning the second shunt control signal to the off value and transitioning the second serial control signal to the on value.

The controller can be further configured to adjust a length of the first delay and the second delay.

The controller can include both digital and analog circuitry configured to implement the first delay and the second delay.

The controller can be further configured to switch between connecting the time-division duplexing transmit terminal and the time-division duplexing receive terminal to the antenna while the frequency division duplexing terminal remains connected to the antenna.

In another aspect, there is provided a mobile device comprising: an antenna configured to transmit radio frequency signals to a base station; a time-division duplexing power amplifier; a time-division duplexing low noise amplifier; a frequency division duplexing terminal; and a front end system coupled to the antenna, the time-division duplexing power amplifier, the time-division duplexing low noise amplifier, and the frequency division duplexing terminal, the front end system including a first switch configured to selectively connect the time-division duplexing power amplifier to either a first node or the antenna based on a first control signal, a second switch configured to selectively connect the time-division duplexing low noise amplifier to either a second node or the antenna based on a second control signal, a third switch configured to connect the frequency division duplexing terminal to the antenna based on a third control signal, and a controller configured to generate the first, second, and third control signals, the controller further configured to provide: i) a first delay between disconnecting the time-division duplexing power amplifier from the antenna and connecting the time-division duplexing power amplifier to the first node, and ii) a second delay between disconnecting the time-division duplexing low noise amplifier from the antenna and connecting the time-division duplexing low noise amplifier to the second node.

The first node and the second node can be ground nodes.

The first switch can include a first serial sub-switch configured to selectively connect the time-division duplexing power amplifier to the antenna and a first shunt sub-switch configured to selectively connect the time-division duplexing power amplifier to the first node, and the second switch can include a second serial sub-switch configured to selectively connect the time-division duplexing low noise amplifier to the antenna and a second shunt sub-switch configured to selectively connect the time-division duplexing low noise amplifier to the second node.

The first control signal can include a first serial control signal configured to control the first serial sub-switch and a first shunt control signal configured to control the first shunt sub-switch, and the second control signal can include a second serial control signal configured to control the second serial sub-switch and a second shunt control signal configured to control the second shunt sub-switch.

The controller can be further configured to provide the first delay between transitioning the first serial control signal to an off value and transitioning the first shunt control signal to an on value, and the controller can be further configured to provide the second delay between transitioning the second serial control signal to the off value and transitioning the second shunt control signal to the on value.

The controller can be further configured to provide a third delay between transitioning the first shunt control signal to the off value and transitioning the first serial control signal to the on value, and the controller can be further configured to provide a fourth delay between transitioning the second shunt control signal to the off value and transitioning the second serial control signal to the on value.

The controller can be further configured to adjust the length of the first delay and the second delay.

The controller can include both digital and analog circuitry configured to implement the first delay and the second delay.

The controller can be further configured to switch between connecting the time-division duplexing power amplifier and the time-division duplexing low noise amplifier to the antenna while the frequency division duplexing terminal remains connected to the antenna.

In yet another aspect, there is provided a method comprising: coupling, via a first switch, a time-division duplexing transmit terminal to either a first node or an antenna based on a first control signal; coupling, via a second switch, a time-division duplexing receive terminal to either a second node or the antenna based on a second control signal; coupling, via a third switch, a frequency division duplexing terminal to the antenna based on a third control signal; providing a first delay between disconnecting the time-division duplexing transmit terminal from the antenna and connecting the time-division duplexing transmit terminal to the first node; and providing a second delay between disconnecting the time-division duplexing receiver terminal from the antenna and connecting the time-division duplexing receive terminal to the second node.

The method can further comprise adjusting a length of the first delay and the second delay.

The method can further comprise: selectively coupling, via a first serial sub-switch, the time-division duplexing transmit terminal to the antenna; selectively coupling, via a first shunt sub-switch, the time-division duplexing transmit terminal to the first node; selectively coupling, via a second serial sub-switch, the time-division duplexing receive terminal to the antenna; and selectively coupling, a second shunt sub-switch, the time-division duplexing receive terminal to the second node.

The method can further comprise: generating a first serial control signal to control the first serial sub-switch; generating a first shunt control signal to control the first shunt sub-switch; generating a second serial control signal to control the second serial sub-switch; and generating a second shunt control signal to control the second shunt sub-switch.

DETAILED DESCRIPTION

Figure 1A:
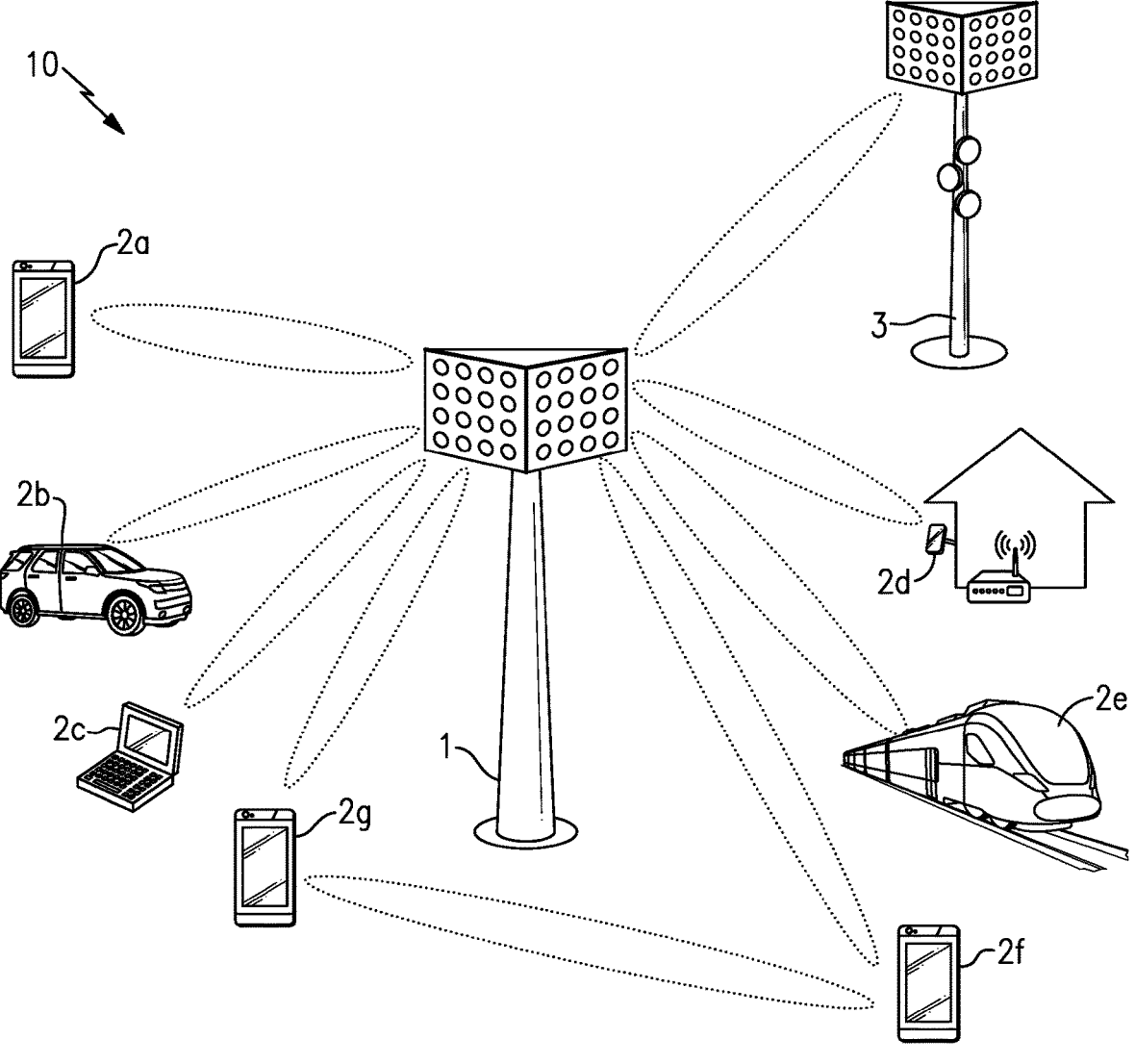
FIG. 1A is a schematic diagram of one example of a communication network.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The International Telecommunication Union (ITU) is a specialized agency of the United Nations (UN) responsible for global issues concerning information and communication technologies, including the shared global use of radio spectrum.

The 3rd Generation Partnership Project (3GPP) is a collaboration between groups of telecommunications standard bodies across the world, such as the Association of Radio Industries and Businesses (ARIB), the Telecommunications Technology Committee (TTC), the China Communications Standards Association (CCSA), the Alliance for Telecommunications Industry Solutions (ATIS), the Telecommunications Technology Association (TTA), the European Telecommunications Standards Institute (ETSI), and the Telecommunications Standards Development Society, India (TSDSI).

Working within the scope of the ITU, 3GPP develops and maintains technical specifications for a variety of mobile communication technologies, including, for example, second generation (2G) technology (for instance, Global System for Mobile Communications (GSM) and Enhanced Data Rates for GSM Evolution (EDGE)), third generation (3G) technology (for instance, Universal Mobile Telecommunications System (UMTS) and High Speed Packet Access (HSPA)), and fourth generation (4G) technology (for instance, Long Term Evolution (LTE) and LTE-Advanced).

The technical specifications controlled by 3GPP can be expanded and revised by specification releases, which can span multiple years and specify a breadth of new features and evolutions.

In one example, 3GPP introduced carrier aggregation (CA) for LTE in Release 10. Although initially introduced with two downlink carriers, 3GPP expanded carrier aggregation in Release 14 to include up to five downlink carriers and up to three uplink carriers. Other examples of new features and evolutions provided by 3GPP releases include, but are not limited to, License Assisted Access (LAA), enhanced LAA (eLAA), Narrowband Internet of things (NB-IOT), Vehicle-to-Everything (V2X), and High Power User Equipment (HPUE).

3GPP introduced Phase 1 of fifth generation (5G) technology in Release 15, and introduced Phase 2 of 5G technology in Release 16 in 2020. Subsequent 3GPP releases will further evolve and expand 5G technology. 5G technology is also referred to herein as 5G New Radio (NR).

5G NR supports or plans to support a variety of features, such as communications over millimeter wave spectrum, beamforming capability, high spectral efficiency waveforms, low latency communications, multiple radio numerology, and/or non-orthogonal multiple access (NOMA). Although such RF functionalities offer flexibility to networks and enhance user data rates, supporting such features can pose a number of technical challenges.

The teachings herein are applicable to a wide variety of communication systems, including, but not limited to, communication systems using advanced cellular technologies, such as LTE-Advanced, LTE-Advanced Pro, and/or 5G NR.

FIG. 1A is a schematic diagram of one example of a communication network 10. The communication network 10 includes a macro cell base station 1, a small cell base station 3, and various examples of user equipment (UE), including a first mobile device 2a, a wireless-connected car 2b, a laptop 2c, a stationary wireless device 2d, a wireless-connected train 2e, a second mobile device 2f, and a third mobile device 2g.

Although specific examples of base stations and user equipment are illustrated in FIG. 1A, a communication network can include base stations and user equipment of a wide variety of types and/or numbers.

For instance, in the example shown, the communication network 10 includes the macro cell base station 1 and the small cell base station 3. The small cell base station 3 can operate with relatively lower power, shorter range, and/or with fewer concurrent users relative to the macro cell base station 1. The small cell base station 3 can also be referred to as a femtocell, a picocell, or a microcell. Although the communication network 10 is illustrated as including two base stations, the communication network 10 can be implemented to include more or fewer base stations and/or base stations of other types.

Although various examples of user equipment are shown, the teachings herein are applicable to a wide variety of user equipment, including, but not limited to, mobile phones, tablets, laptops, IoT devices, wearable electronics, customer premises equipment (CPE), wireless-connected vehicles, wireless relays, and/or a wide variety of other communication devices. Furthermore, user equipment includes not only currently available communication devices that operate in a cellular network, but also subsequently developed communication devices that will be readily implementable with the inventive systems, processes, methods, and devices as described and claimed herein.

The illustrated communication network 10 of FIG. 1A supports communications using a variety of cellular technologies, including, for example, 4G LTE and 5G NR. In certain implementations, the communication network 10 is further adapted to provide a wireless local area network (WLAN), such as WiFi. Although various examples of communication technologies have been provided, the communication network 10 can be adapted to support a wide variety of communication technologies.

Various communication links of the communication network 10 have been depicted in FIG. 1A. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

In certain implementations, user equipment can communicate with a base station using one or more of 4G LTE, 5G NR, and WiFi technologies. In certain implementations, enhanced license assisted access (eLAA) is used to aggregate one or more licensed frequency carriers (for instance, licensed 4G LTE and/or 5G NR frequencies), with one or more unlicensed carriers (for instance, unlicensed WiFi frequencies).

As shown in FIG. 1A, the communication links include not only communication links between UE and base stations, but also UE to UE communications and base station to base station communications. For example, the communication network 10 can be implemented to support self-fronthaul and/or self-backhaul (for instance, as between mobile device 2g and mobile device 2f).

The communication links can operate over a wide variety of frequencies. In certain implementations, communications are supported using 5G NR technology over one or more frequency bands that are less than 6 Gigahertz (GHz) and/or over one or more frequency bands that are greater than 6 GHz. For example, the communication links can serve Frequency Range 1 (FR1), Frequency Range 2 (FR2), or a combination thereof. In one embodiment, one or more of the mobile devices support a HPUE power class specification.

In certain implementations, a base station and/or user equipment communicates using beamforming. For example, beamforming can be used to focus signal strength to overcome path losses, such as high loss associated with communicating over high signal frequencies. In certain embodiments, user equipment, such as one or more mobile phones, communicate using beamforming on millimeter wave frequency bands in the range of 30 GHz to 300 GHz and/or upper centimeter wave frequencies in the range of 6 GHz to 30 GHz, or more particularly, 24 GHz to 30 GHz.

Different users of the communication network 10 can share available network resources, such as available frequency spectrum, in a wide variety of ways.

In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDMA is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning each user a unique code, space-divisional multiple access (SDMA) in which beamforming is used to provide shared access by spatial division, and non-orthogonal multiple access (NOMA) in which the power domain is used for multiple access. For example, NOMA can be used to serve multiple users at the same frequency, time, and/or code, but with different power levels.

Enhanced mobile broadband (eMBB) refers to technology for growing system capacity of LTE networks. For example, eMBB can refer to communications with a peak data rate of at least 10 Gbps and a minimum of 100 Mbps for each user. Ultra-reliable low latency communications (uRLLC) refers to technology for communication with very low latency, for instance, less than 2 milliseconds. uRLLC can be used for mission-critical communications such as for autonomous driving and/or remote surgery applications. Massive machine-type communications (mMTC) refers to low cost and low data rate communications associated with wireless connections to everyday objects, such as those associated with Internet of Things (IoT) applications.

The communication network 10 of FIG. 1A can be used to support a wide variety of advanced communication features, including, but not limited to, eMBB, uRLLC, and/or mMTC.

Figure 1B:
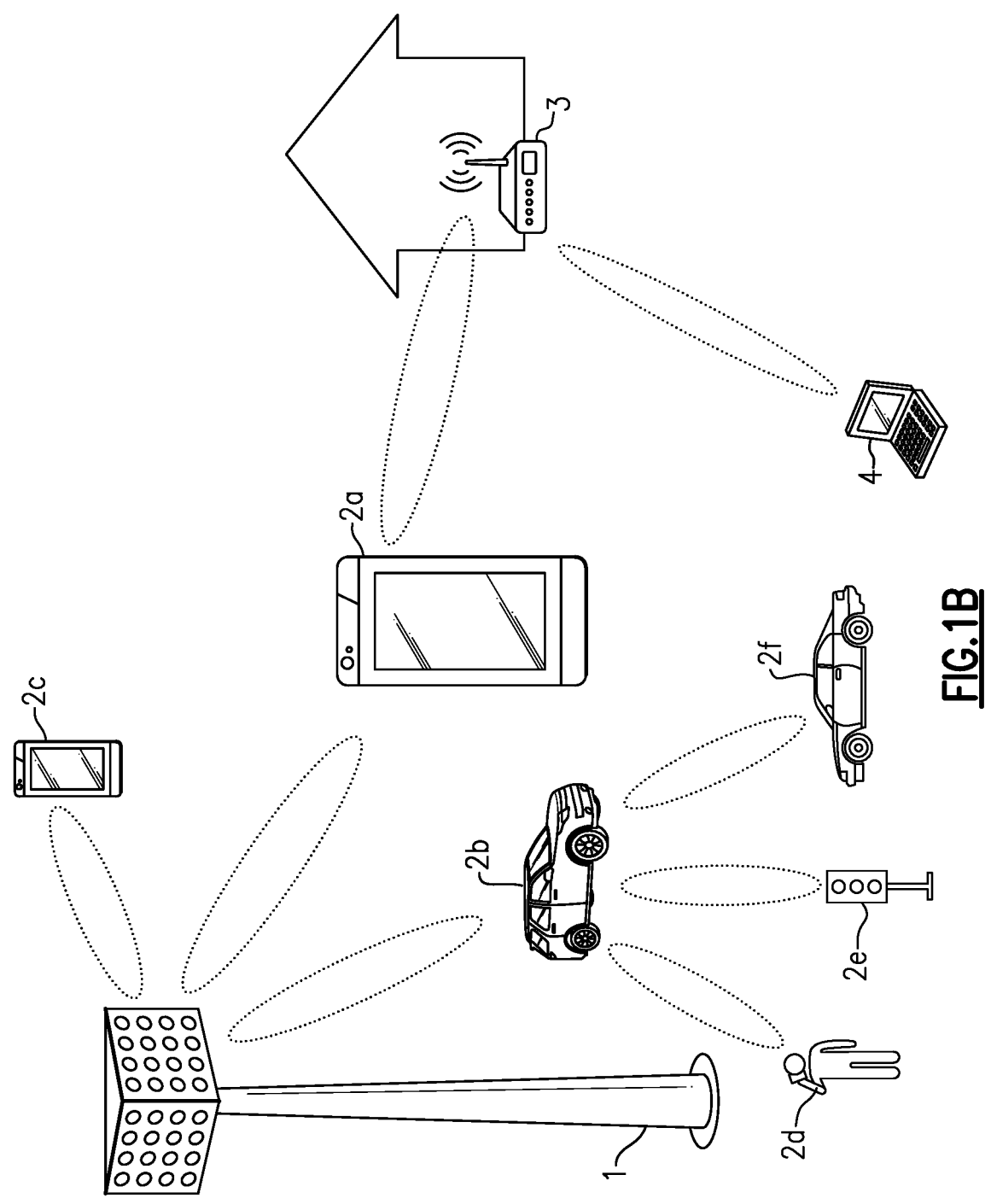
FIG. 1B is a schematic diagram of one example of a mobile device communicating via cellular and WiFi networks.

FIG. 1B is a schematic diagram of one example of a mobile device 2a communicating via cellular and WiFi networks. For example, as shown in FIG. 1B, the mobile device 2a communicates with a base station 1 of a cellular network and with a WiFi access point 3 of a WiFi network. FIG. 1B also depicts examples of other user equipment (UE) communicating with the base station 1, for instance, a wireless-connected car 2b and another mobile device 2c. Furthermore, FIG. 1B also depicts examples of other WiFi-enabled devices communicating with the WiFi access point 3, for instance, a laptop 4.

Although specific examples of cellular UE and WiFi-enabled devices is shown, a wide variety of types of devices can communicate using cellular and/or WiFi networks. Examples of such devices, include, but are not limited to, mobile phones, tablets, laptops, Internet of Things (IoT) devices, wearable electronics, customer premises equipment (CPE), wireless-connected vehicles, wireless relays, and/or a wide variety of other communication devices.

In certain implementations, UE, such as the mobile device 2a of FIG. 1B, is implemented to support communications using a number of technologies, including, but not limited to, 2G, 3G, 4G (including LTE, LTE-Advanced, and LTE-Advanced Pro), 5G NR, WLAN (for instance, WiFi), WPAN (for instance, Bluetooth and ZigBee), WMAN (for instance, WiMax), and/or GPS. In certain implementations, enhanced license assisted access (eLAA) is used to aggregate one or more licensed frequency carriers (for instance, licensed 4G LTE and/or 5G NR frequencies), with one or more unlicensed carriers (for instance, unlicensed WiFi frequencies).

Furthermore, certain UE can communicate not only with base stations and access points, but also with other UE. For example, the wireless-connected car 2b can communicate with a wireless-connected pedestrian 2d, a wireless-connected stop light 2e, and/or another wireless-connected car 2f using vehicle-to-vehicle (V2V) and/or vehicle-to-everything (V2X) communications.

Although various examples of communication technologies have been described, mobile devices can be implemented to support a wide range of communications.

Various communication links have been depicted in FIG. 1B. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

Different users of the illustrated communication networks can share available network resources, such as available frequency spectrum, in a wide variety of ways. In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDM is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning each user a unique code, space-divisional multiple access (SDMA) in which beamforming is used to provide shared access by spatial division, and non-orthogonal multiple access (NOMA) in which the power domain is used for multiple access. For example, NOMA can be used to serve multiple users at the same frequency, time, and/or code, but with different power levels.

Certain RF communication systems include multiple transceivers for communicating using different wireless networks, over multiple frequency bands, and/or using different communication standards. Although implementing an RF communication system in this manner can expand functionality, increase bandwidth, and/or enhance flexibility, a number of coexistence issues can arise between the transceivers operating within the RF communication system.

For example, an RF communication system can include a cellular transceiver for processing RF signals communicated over a cellular network and a wireless local area network (WLAN) transceiver for processing RF signals communicated over a WLAN network, such as a WiFi network. For instance, the mobile device $2a$ of FIG. 1B is operable to communicate using cellular and WiFi networks.

Although implementing the RF communication system in this manner can provide a number of benefits, a mutual desensitization effect can arise from cellular transmissions interfering with reception of WiFi signals and/or from WiFi transmissions interfering with reception of cellular signals.

In one example, cellular Band 7 can give rise to mutual desensitization with respect to 2.4 Gigahertz (GHz) WiFi. For instance, Band 7 has an FDD duplex and operates over a frequency range of about 2.62 GHz to 2.69 GHz for downlink and over a frequency range of about 2.50 GHz to about 2.57 GHz for uplink, while 2.4 GHz WiFi has TDD duplex and operates over a frequency range of about 2.40 GHz to about 2.50 GHz. Thus, cellular Band 7 and 2.4 GHz WiFi are adjacent in frequency, and RF signal leakage due to the high power transmitter of one transceiver/front end affects receiver performance of the other transceiver/front end, particularly at border frequency channels.

In another example, cellular Band 40 and 2.4 GHz WiFi can give rise to mutual desensitization. For example, Band 40 has a TDD duplex and operates over a frequency range of about 2.30 GHz to about 2.40 GHz, while 2.4 GHz WiFi has TDD duplex and operates over a frequency range of about 2.40 GHz to about 2.50 GHz. Accordingly, cellular Band 40 and 2.4 GHz WiFi are adjacent in frequency and give rise to a number of coexistence issues, particularly at border frequency channels.

Desensitization can arise not only from direct leakage of an aggressor transmit signal to a victim receiver, but also from spectral regrowth components generated in the transmitter. Such interference can lie relatively closely in frequency with the victim receive signal and/or directly overlap it.

Figure 2A:
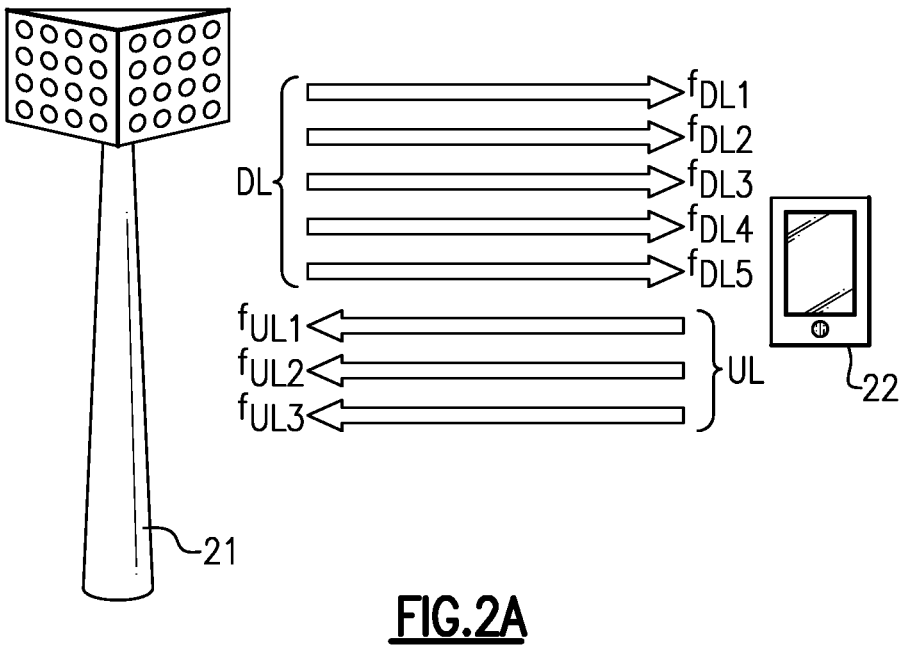
FIG. 2A is a schematic diagram of one example of a communication link using carrier aggregation.

FIG. 2A is a schematic diagram of one example of a communication link using carrier aggregation. Carrier aggregation can be used to widen bandwidth of the communication link by supporting communications over multiple frequency carriers, thereby increasing user data rates and enhancing network capacity by utilizing fragmented spectrum allocations.

In the illustrated example, the communication link is provided between a base station 21 and a mobile device 22. As shown in FIG. 2A, the communications link includes a downlink channel used for RF communications from the base station 21 to the mobile device 22, and an uplink channel used for RF communications from the mobile device 22 to the base station 21.

Although FIG. 2A illustrates carrier aggregation in the context of FDD communications, carrier aggregation can also be used for TDD communications.

In certain implementations, a communication link can provide asymmetrical data rates for a downlink channel and an uplink channel. For example, a communication link can be used to support a relatively high downlink data rate to enable high speed streaming of multimedia content to a mobile device, while providing a relatively slower data rate for uploading data from the mobile device to the cloud.

In the illustrated example, the base station 21 and the mobile device 22 communicate via carrier aggregation, which can be used to selectively increase bandwidth of the communication link. Carrier aggregation includes contiguous aggregation, in which contiguous carriers within the same operating frequency band are aggregated. Carrier aggregation can also be non-contiguous, and can include carriers separated in frequency within a common band or in different bands.

In the example shown in FIG. 2A, the uplink channel includes three aggregated component carriers $f_{UL1}$, $f_{UL2}$, and $f_{UL3}$. Additionally, the downlink channel includes five aggregated component carriers $f_{DL1}$, $f_{DL2}$, $f_{DL3}$, $f_{DL4}$, and $f_{DL5}$. Although one example of component carrier aggregation is shown, more or fewer carriers can be aggregated for uplink and/or downlink. Moreover, a number of aggregated carriers can be varied over time to achieve desired uplink and downlink data rates.

For example, a number of aggregated carriers for uplink and/or downlink communications with respect to a particular mobile device can change over time. For example, the number of aggregated carriers can change as the device moves through the communication network and/or as network usage changes over time.

Figure 2B:
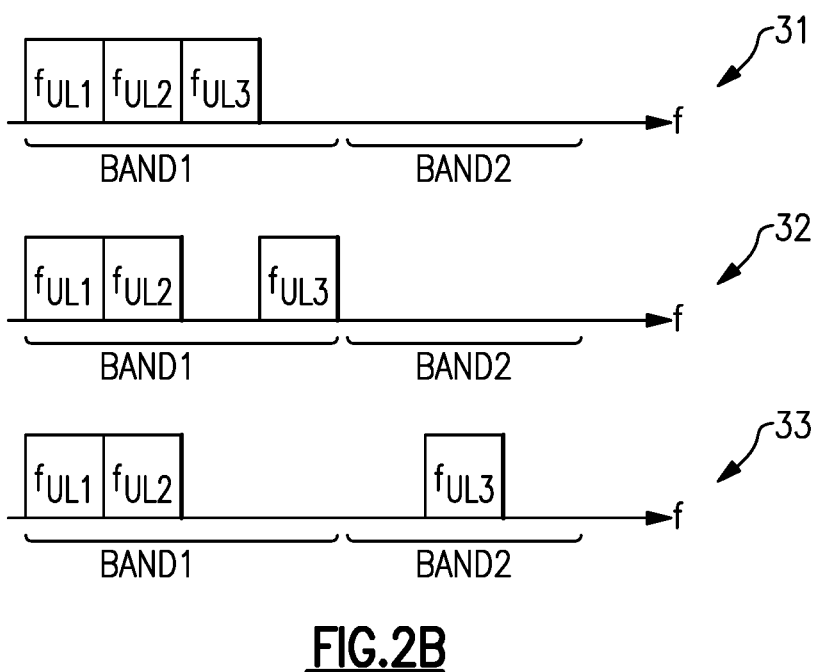
FIG. 2B illustrates various examples of uplink carrier aggregation for the communication link of FIG. 2A.

FIG. 2B illustrates various examples of uplink carrier aggregation for the communication link of FIG. 2A. FIG. 2B includes a first carrier aggregation scenario 31, a second carrier aggregation scenario 32, and a third carrier aggregation scenario 33, which schematically depict three types of carrier aggregation.

The carrier aggregation scenarios 31-33 illustrate different spectrum allocations for a first component carrier $f_{UL1}$, a second component carrier $f_{UL2}$, and a third component carrier $f_{UL3}$. Although FIG. 2B is illustrated in the context of aggregating three component carriers, carrier aggregation can be used to aggregate more or fewer carriers. Moreover, although illustrated in the context of uplink, the aggregation scenarios are also applicable to downlink.

The first carrier aggregation scenario 31 illustrates intra-band contiguous carrier aggregation, in which component carriers that are adjacent in frequency and in a common frequency band are aggregated. For example, the first carrier aggregation scenario 31 depicts aggregation of component carriers $f_{UL1}$, $f_{UL2}$, and $f_{UL3}$ that are contiguous and located within a first frequency band BAND1.

With continuing reference to FIG. 2B, the second carrier aggregation scenario 32 illustrates intra-band non-continuous carrier aggregation, in which two or more components carriers that are non-adjacent in frequency and within a common frequency band are aggregated. For example, the second carrier aggregation scenario 32 depicts aggregation of component carriers $f_{UL1}$, $f_{UL2}$, and $f_{UL3}$ that are non-contiguous, but located within a first frequency band BAND1.

The third carrier aggregation scenario 33 illustrates inter-band non-contiguous carrier aggregation, in which component carriers that are non-adjacent in frequency and in multiple frequency bands are aggregated. For example, the third carrier aggregation scenario 33 depicts aggregation of component carriers $f_{UL1}$ and $f_{UL2}$ of a first frequency band BAND1 with component carrier $f_{UL3}$ of a second frequency band BAND2.

Figure 2C:
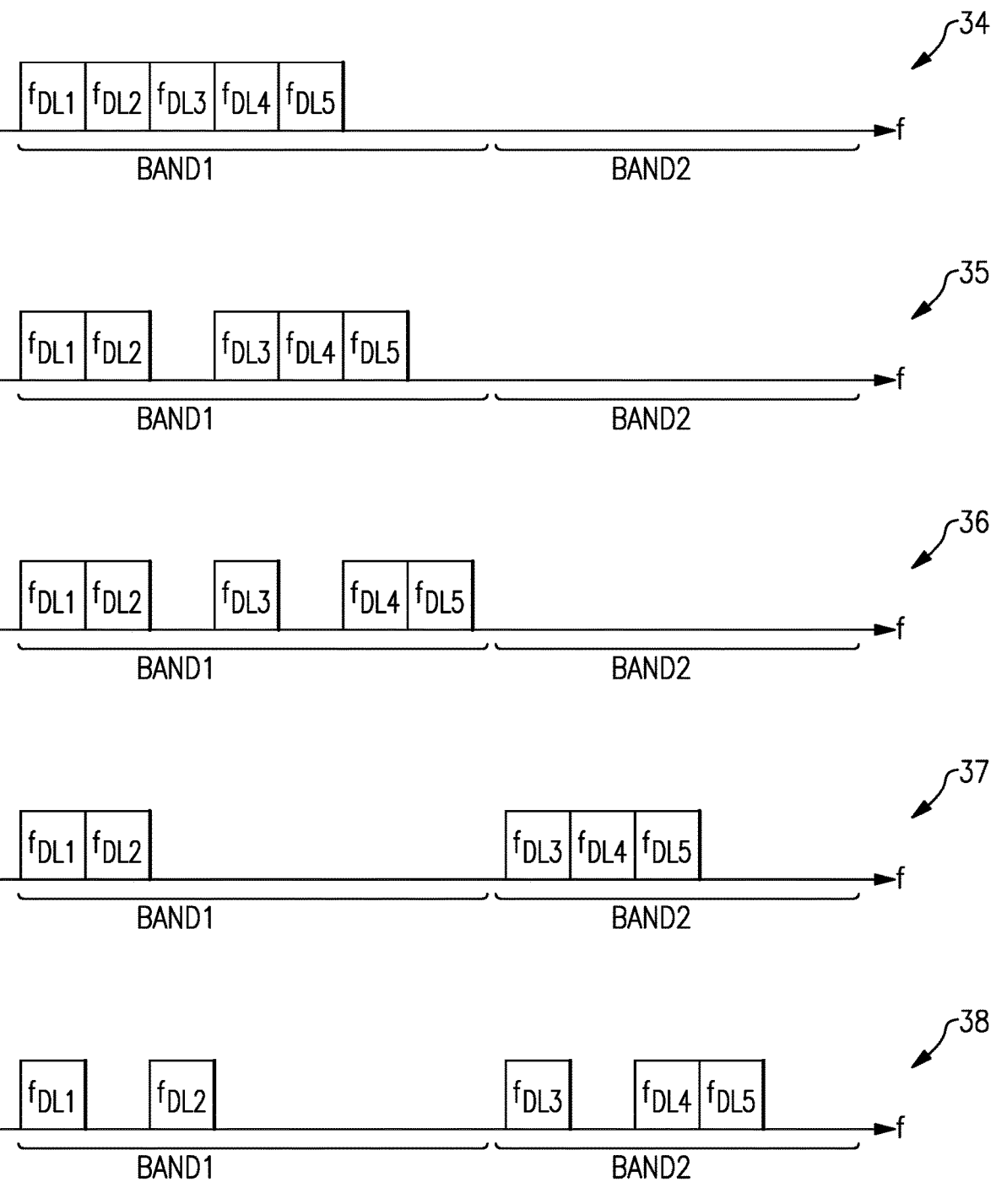
FIG. 2C illustrates various examples of downlink carrier aggregation for the communication link of FIG. 2A.

FIG. 2C illustrates various examples of downlink carrier aggregation for the communication link of FIG. 2A. The examples depict various carrier aggregation scenarios 34-38 for different spectrum allocations of a first component carrier $f_{DL1}$, a second component carrier $f_{DL2}$, a third component carrier $f_{DL3}$, a fourth component carrier $f_{DL4}$, and a fifth component carrier $f_{DL5}$. Although FIG. 2C is illustrated in the context of aggregating five component carriers, carrier aggregation can be used to aggregate more or fewer carriers. Moreover, although illustrated in the context of downlink, the aggregation scenarios are also applicable to uplink.

The first carrier aggregation scenario 34 depicts aggregation of component carriers that are contiguous and located within the same frequency band. Additionally, the second carrier aggregation scenario 35 and the third carrier aggregation scenario 36 illustrates two examples of aggregation that are non-contiguous, but located within the same frequency band. Furthermore, the fourth carrier aggregation scenario 37 and the fifth carrier aggregation scenario 38 illustrates two examples of aggregation in which component carriers that are non-adjacent in frequency and in multiple frequency bands are aggregated. As a number of aggregated component carriers increases, a complexity of possible carrier aggregation scenarios also increases.

With reference to FIGS. 2A-2C, the individual component carriers used in carrier aggregation can be of a variety of frequencies, including, for example, frequency carriers in the same band or in multiple bands. Additionally, carrier aggregation is applicable to implementations in which the individual component carriers are of about the same bandwidth as well as to implementations in which the individual component carriers have different bandwidths.

Certain communication networks allocate a particular user device with a primary component carrier (PCC) or anchor carrier for uplink and a PCC for downlink. Additionally, when the mobile device communicates using a single frequency carrier for uplink or downlink, the user device communicates using the PCC. To enhance bandwidth for uplink communications, the uplink PCC can be aggregated with one or more uplink secondary component carriers (SCCs). Additionally, to enhance bandwidth for downlink communications, the downlink PCC can be aggregated with one or more downlink SCCs.

In certain implementations, a communication network provides a network cell for each component carrier. Additionally, a primary cell can operate using a PCC, while a secondary cell can operate using a SCC. The primary and secondary cells may have different coverage areas, for instance, due to differences in frequencies of carriers and/or network environment.

License assisted access (LAA) refers to downlink carrier aggregation in which a licensed frequency carrier associated with a mobile operator is aggregated with a frequency carrier in unlicensed spectrum, such as WiFi. LAA employs a downlink PCC in the licensed spectrum that carries control and signaling information associated with the communication link, while unlicensed spectrum is aggregated for wider downlink bandwidth when available. LAA can operate with dynamic adjustment of secondary carriers to avoid WiFi users and/or to coexist with WiFi users. Enhanced license assisted access (eLAA) refers to an evolution of LAA that aggregates licensed and unlicensed spectrum for both downlink and uplink.

Figure 3:
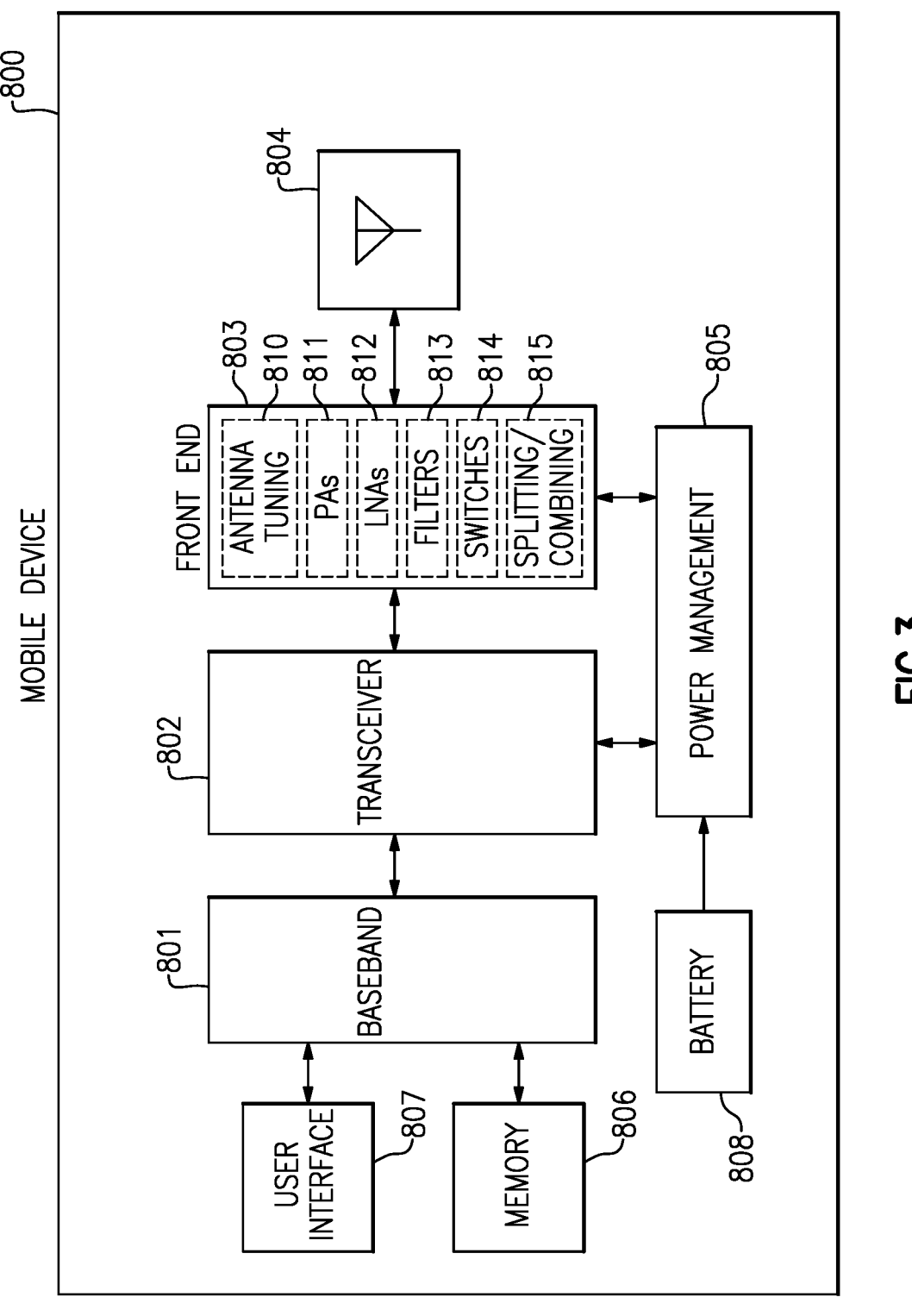
FIG. 3 is a schematic diagram of one embodiment of a mobile device.

FIG. 3 is a schematic diagram of one embodiment of a mobile device 800. The mobile device 800 includes a baseband system 801, a transceiver 802, a front end system 803, antennas 804, a power management system 805, a memory 806, a user interface 807, and a battery 808.

The mobile device 800 can be used communicate using a wide variety of communications technologies, including, but not limited to, 2G, 3G, 4G (including LTE, LTE-Advanced, and LTE-Advanced Pro), 5G NR, WLAN (for instance, WiFi), WPAN (for instance, Bluetooth and ZigBee), WMAN (for instance, WiMax), and/or GPS technologies.

The transceiver 802 generates RF signals for transmission and processes incoming RF signals received from the antennas 804. It will be understood that various functionalities associated with the transmission and receiving of RF signals can be achieved by one or more components that are collectively represented in FIG. 3 as the transceiver 802. In one example, separate components (for instance, separate circuits or dies) can be provided for handling certain types of RF signals.

The front end system 803 aids in conditioning signals transmitted to and/or received from the antennas 804. In the illustrated embodiment, the front end system 803 includes antenna tuning circuitry 810, power amplifiers (PAs) 811, low noise amplifiers (LNAs) 812, filters 813, switches 814, and signal splitting/combining circuitry 815. However, other implementations are possible.

For example, the front end system 803 can provide a number of functionalities, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), or some combination thereof.

In certain implementations, the mobile device 800 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The antennas 804 can include antennas used for a wide variety of types of communications. For example, the antennas 804 can include antennas for transmitting and/or receiving signals associated with a wide variety of frequencies and communications standards.

In certain implementations, the antennas 804 support MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

The mobile device 800 can operate with beamforming in certain implementations. For example, the front end system 803 can include amplifiers having controllable gain and phase shifters having controllable phase to provide beam formation and directivity for transmission and/or reception of signals using the antennas 804. For example, in the context of signal transmission, the amplitude and phases of the transmit signals provided to the antennas 804 are controlled such that radiated signals from the antennas 804 combine using constructive and destructive interference to generate an aggregate transmit signal exhibiting beam-like qualities with more signal strength propagating in a given direction. In the context of signal reception, the amplitude and phases are controlled such that more signal energy is received when the signal is arriving to the antennas 804 from a particular direction. In certain implementations, the antennas 804 include one or more arrays of antenna elements to enhance beamforming.

The baseband system 801 is coupled to the user interface 807 to facilitate processing of various user input and output (I/O), such as voice and data. The baseband system 801 provides the transceiver 802 with digital representations of transmit signals, which the transceiver 802 processes to generate RF signals for transmission. The baseband system 801 also processes digital representations of received signals provided by the transceiver 802. As shown in FIG. 3, the baseband system 801 is coupled to the memory 806 of facilitate operation of the mobile device 800.

The memory 806 can be used for a wide variety of purposes, such as storing data and/or instructions to facilitate the operation of the mobile device 800 and/or to provide storage of user information.

The power management system 805 provides a number of power management functions of the mobile device 800. In certain implementations, the power management system 805 includes a PA supply control circuit that controls the supply voltages of the power amplifiers 811. For example, the power management system 805 can be configured to change the supply voltage(s) provided to one or more of the power amplifiers 811 to improve efficiency, such as power added efficiency (PAE).

As shown in FIG. 3, the power management system 805 receives a battery voltage from the battery 808. The battery 808 can be any suitable battery for use in the mobile device 800, including, for example, a lithium-ion battery.

Figure 4:
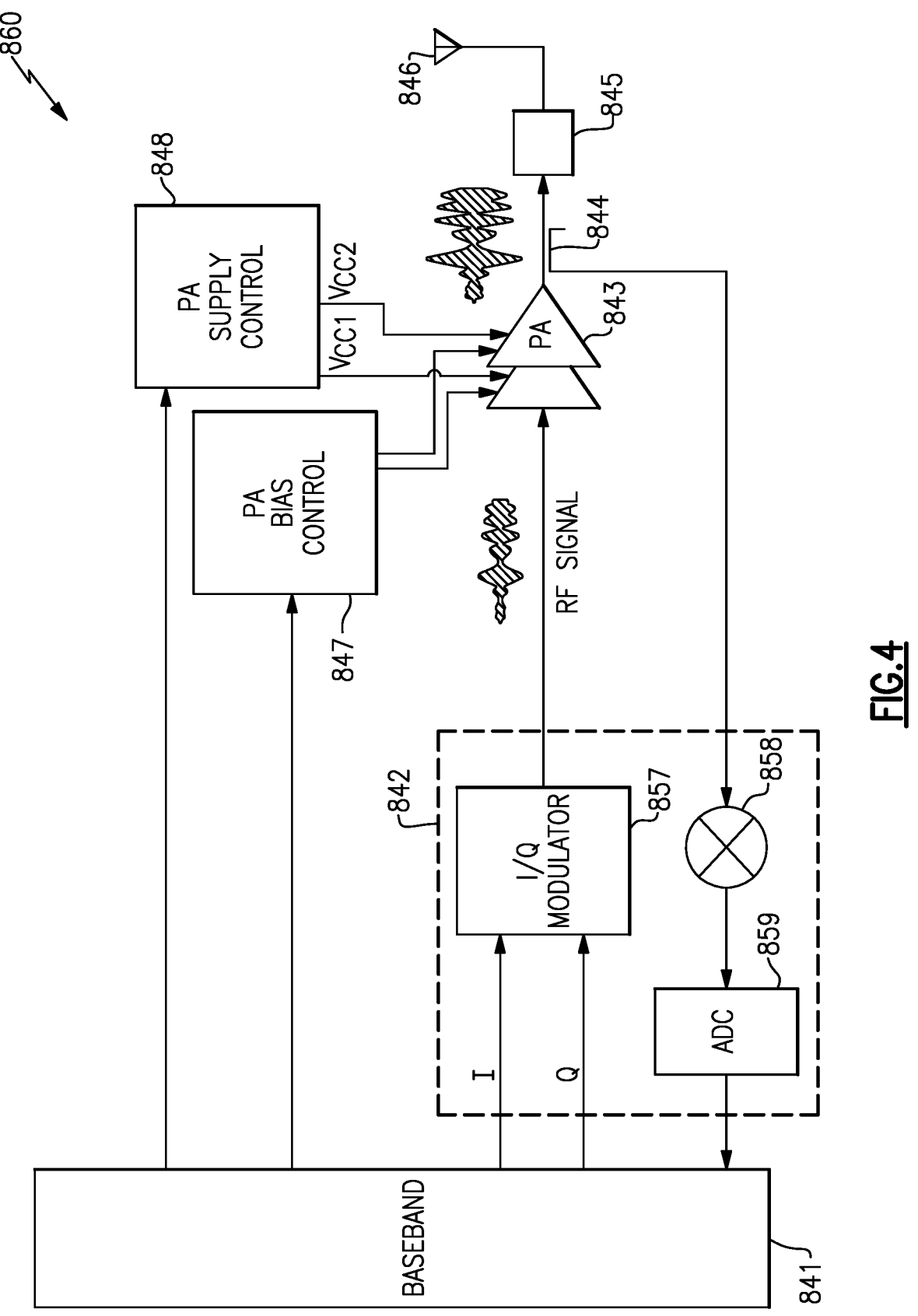
FIG. 4 is a schematic diagram of a power amplifier system according to one embodiment.

FIG. 4 is a schematic diagram of a power amplifier system 860 according to one embodiment. The illustrated power amplifier system 860 includes a baseband processor 841, a transmitter/observation receiver 842, a power amplifier (PA) 843, a directional coupler 844, front-end circuitry 845, an antenna 846, a PA bias control circuit 847, and a PA supply control circuit 848. The illustrated transmitter/observation receiver 842 includes an I/Q modulator 857, a mixer 858, and an analog-to-digital converter (ADC) 859. In certain implementations, the transmitter/observation receiver 842 is incorporated into a transceiver.

The baseband processor 841 can be used to generate an in-phase (I) signal and a quadrature-phase (Q) signal, which can be used to represent a sinusoidal wave or signal of a desired amplitude, frequency, and phase. For example, the I signal can be used to represent an in-phase component of the sinusoidal wave and the Q signal can be used to represent a quadrature-phase component of the sinusoidal wave, which can be an equivalent representation of the sinusoidal wave. In certain implementations, the I and Q signals can be provided to the I/Q modulator 857 in a digital format. The baseband processor 841 can be any suitable processor configured to process a baseband signal. For instance, the baseband processor 841 can include a digital signal processor, a microprocessor, a programmable core, or any combination thereof. Moreover, in some implementations, two or more baseband processors 841 can be included in the power amplifier system 860.

The I/Q modulator 857 can be configured to receive the I and Q signals from the baseband processor 841 and to process the I and Q signals to generate an RF signal. For example, the I/Q modulator 857 can include digital-to-analog converters (DACs) configured to convert the I and Q signals into an analog format, mixers for upconverting the I and Q signals to RF, and a signal combiner for combining the upconverted I and Q signals into an RF signal suitable for amplification by the power amplifier 843. In certain implementations, the I/Q modulator 857 can include one or more filters configured to filter frequency content of signals processed therein.

The power amplifier 843 can receive the RF signal from the I/Q modulator 857, and when enabled can provide an amplified RF signal to the antenna 846 via the front-end circuitry 845.

The front-end circuitry 845 can be implemented in a wide variety of ways. In one example, the front-end circuitry 845 includes one or more switches, filters, diplexers, multiplexers, and/or other components. In another example, the front-end circuitry 845 is omitted in favor of the power amplifier 843 providing the amplified RF signal directly to the antenna 846.

The directional coupler 844 senses an output signal of the power amplifier 823. Additionally, the sensed output signal from the directional coupler 844 is provided to the mixer 858, which multiplies the sensed output signal by a reference signal of a controlled frequency. The mixer 858 operates to generate a downshifted signal by downshifting the sensed output signal's frequency content. The downshifted signal can be provided to the ADC 859, which can convert the downshifted signal to a digital format suitable for processing by the baseband processor 841. Including a feedback path from the output of the power amplifier 843 to the baseband processor 841 can provide a number of advantages. For example, implementing the baseband processor 841 in this manner can aid in providing power control, compensating for transmitter impairments, and/or in performing digital pre-distortion (DPD). Although one example of a sensing path for a power amplifier is shown, other implementations are possible.

The PA supply control circuit 848 receives a power control signal from the baseband processor 841, and controls supply voltages of the power amplifier 843. In the illustrated configuration, the PA supply control circuit 848 generates a first supply voltage $V_{CC1}$ for powering an input stage of the power amplifier 843 and a second supply voltage $V_{CC2}$ for powering an output stage of the power amplifier 843. The PA supply control circuit 848 can control the voltage level of the first supply voltage $V_{CC1}$ and/or the second supply voltage $V_{CC2}$ to enhance the power amplifier system's PAE.

The PA supply control circuit 848 can employ various power management techniques to change the voltage level of one or more of the supply voltages over time to improve the power amplifier's power added efficiency (PAE), thereby reducing power dissipation.

One technique for improving efficiency of a power amplifier is average power tracking (APT), in which a DC-to-DC converter is used to generate a supply voltage for a power amplifier based on the power amplifier's average output power. Another technique for improving efficiency of a power amplifier is envelope tracking (ET), in which a supply voltage of the power amplifier is controlled in relation to the envelope of the RF signal. Thus, when a voltage level of the envelope of the RF signal increases the voltage level of the power amplifier's supply voltage can be increased. Likewise, when the voltage level of the envelope of the RF signal decreases the voltage level of the power amplifier's supply voltage can be decreased to reduce power consumption.

In certain configurations, the PA supply control circuit 848 is a multi-mode supply control circuit that can operate in multiple supply control modes including an APT mode and an ET mode. For example, the power control signal from the baseband processor 841 can instruct the PA supply control circuit 848 to operate in a particular supply control mode.

As shown in FIG. 4, the PA bias control circuit 847 receives a bias control signal from the baseband processor 841, and generates bias control signals for the power amplifier 843. In the illustrated configuration, the bias control circuit 847 generates bias control signals for both an input stage of the power amplifier 843 and an output stage of the power amplifier 843. However, other implementations are possible.

Embodiments of RF Front End Modules

As described above, communications systems typically include an RF front end designed to connect a one or more band paths to one or more antennas and process the RF signals communicated therebetween. It may be desirable to implement carrier aggregation over an increasingly greater number of bands of a 5G system. Since an RF communication systems typically have a limited number of antennas, as more bands are included in the carrier agreement implementation of the front end modules of 5G systems, it may be necessary both a TDD band switch and an FDD band switch share the same antenna port of an antenna switch block.

Figure 5:
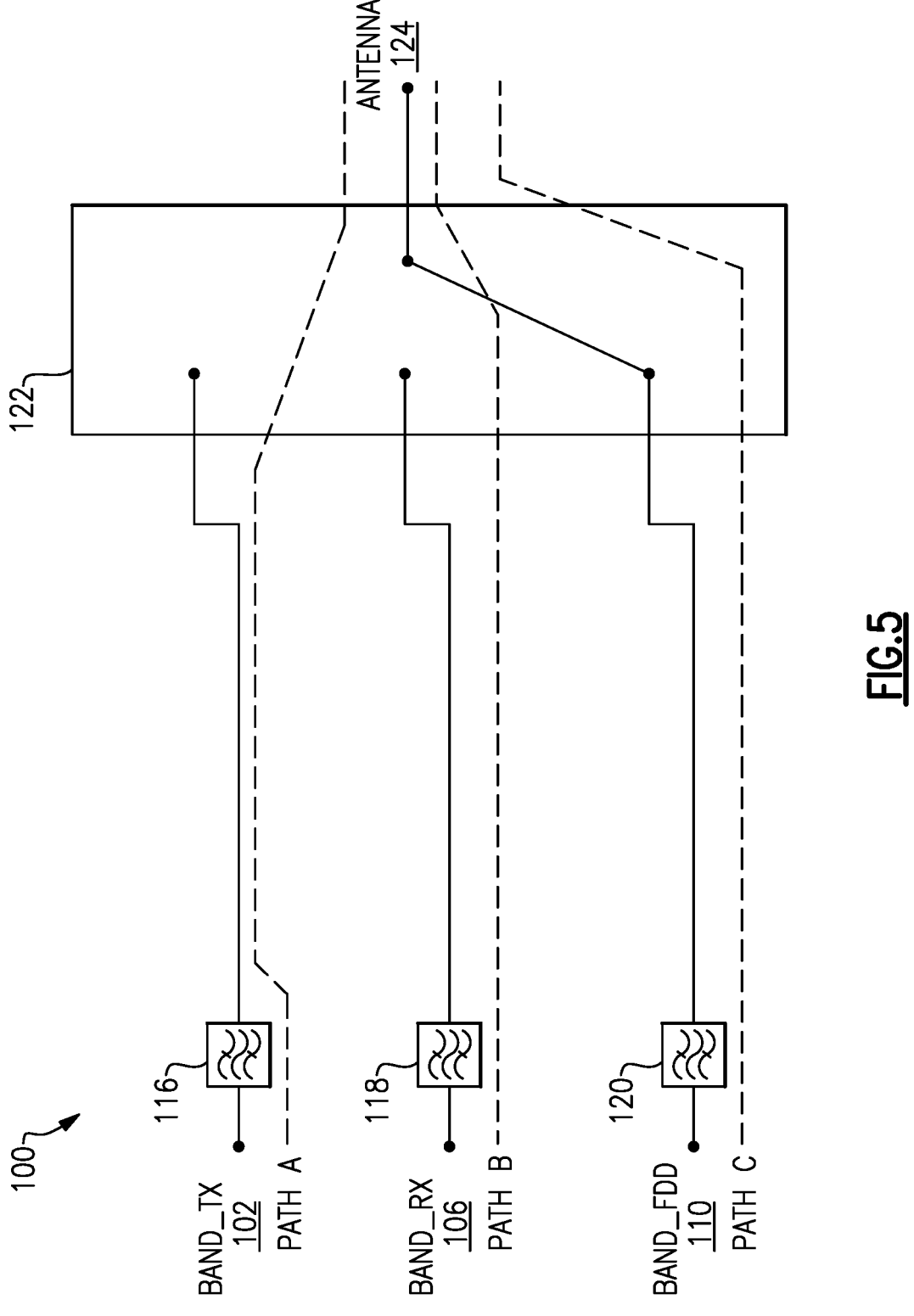
FIG. 5 is an example block diagram of a front end module in accordance with aspects of this disclosure.

FIG. 5 is an example block diagram of a front end module 100 in accordance with aspects of this disclosure. As shown in FIG. 5, the front end module 100 includes a TDD transmit band terminal 102, a TDD receive band terminal 106, an FDD band terminal 110, and an antenna 124. The antenna is connected to each of the terminals 102-110 via a switch 122. The TDD transmit band terminal 102 may be connected to a power amplifier (e.g., the power amplifier 843 of FIG. 4) configured to amplify an RF signal for transmission via the antenna. The TDD receive band terminal 106 may be connected to a low noise amplifier (e.g., the low noise amplifier 812) configured to amplify an RF signal received via the antenna. The FDD band terminal 110 may be connected to both a power amplifier and a low noise amplifier, configured to operate on different frequencies.

Three paths are formed between the band terminals 102-110 and the antenna: path A is formed between the TDD transmit band terminal 102 and the antenna 124, path B is formed between the TDD receive band terminal 106 and the antenna 124, and path C is formed between the FDD band terminal 110 and the antenna 124. Each of the paths may include a corresponding filter 116 configured to pass frequencies corresponding to the bands of the band terminals 102-110 and reject other frequencies.

In order to implement carrier aggregation on both the TDD band and the FDD band, the switch 122 may be configured to connect both the FDD band terminal 110 and one of the TDD transmit band terminal 102 and the TDD receive band terminal 106 to the antenna 124. Accordingly, the front end module 100 can be configured to communicate on the TDD and FDD band simultaneously to enable carrier aggregation.

When the front end module 100 implements carrier aggregation including both TDD and FDD bands, there can be significant error vector magnitude (EVM) degradation on the FDD band (e.g., path C). EVM can be used as a measure of the accuracy of transmitted signals. In an example of carrier aggregation, in order to transmit using TDD, the switch 122 may switch back and forth between paths A and B. This switching between the TDD receive and transmit bands can interfere with signals transmitted on the FDD band (e.g., path C), for example, by briefly connecting the antenna, and thus path C, to ground. The interference on the FDD band will be explained further below.

Aspects of this disclosure relate to systems and techniques which can be used to suppress or reduce the EVM degradation on the FDD band caused by switching on the connected TDD bands.

Figure 6:
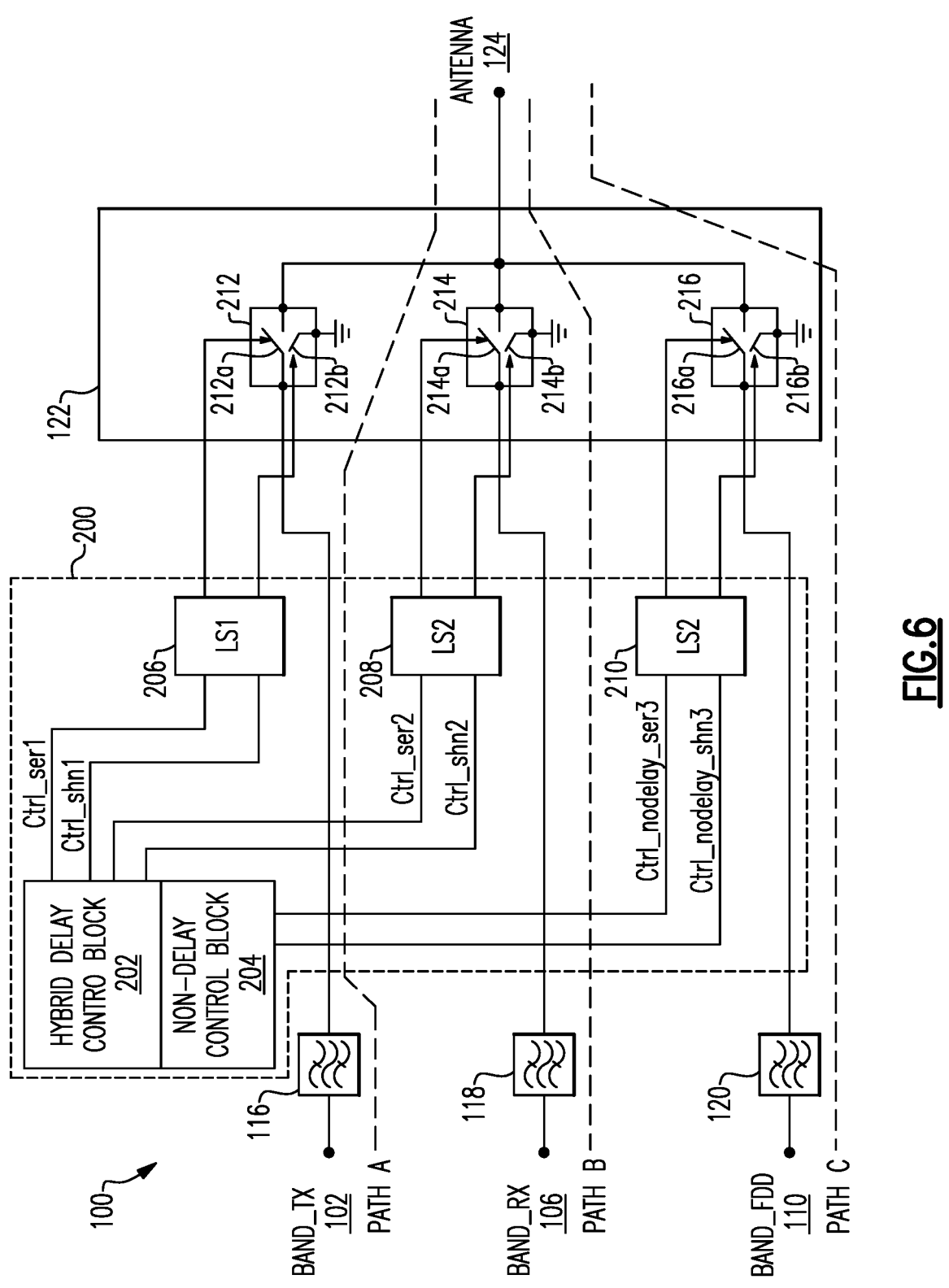
FIG. 6 is an example block diagram of a control system for the front end module of FIG. 5 in accordance with aspects of this disclosure.

FIG. 6 is an example block diagram of a control system 200 for the front end module 100 of FIG. 5 in accordance with aspects of this disclosure. As shown in FIG. 6, the switch 122 can include a first switch 212, a second switch 214, and a third switch 216 respectively connected on paths A, B, and C. Each of the switches 212-216 is configured to selectively connect the antenna 124 to the corresponding path (e.g., path A, B, or C) or ground. In the illustrated embodiment, each switch may comprise a pair of independently controllable single pole single throw (SPST) switches. For example, the first switch 212 includes a first sub-switch 212a configured to selective connect or disconnect the antenna 124 to the TDD transmit band terminal 102 and a second sub-switch 212b configured to selective connect or disconnect the TDD transmit band terminal 102 to ground. The first sub-switch 212a may also be referred to as a series switch since the first sub-switch 212a can selectively connect the TDD transmit band terminal 102 to the antenna 124 in series, while the second sub-switch 212b may also be referred to as a shunt switch since the second sub-switch 212b can selectively shunt the TDD transmit band terminal 102 to ground.

The control system 200 system includes a hybrid delay control block 202 and a non-delay control block 204. As shown in FIG. 6, the hybrid delay control block 202 is configured to control operation of the first and second switches 212 and 214 while the non-delay control block 204 is configured to control the third switch 216. During carrier aggregation, the FDD band and the TDD band may operate at the same time. Accordingly, the switch 122 may simultaneously connect the antenna 124 to both the FDD band terminal 110 and one of the TDD transmit and receive band terminals 102 and 106.

EVM degradation in the FDD band receive path (e.g., path C) may occur when switching between the TDD band transmit path (path A) and receive path (path B). For example, the dynamic on-resistance variation of the third switch 216 on the FDD band path (path C) during the switching duration of changing the states of the first and second switches 212 and 214. The EVM degradation is caused by simultaneous switching of the first and second switches 212 and 214 without delaying the gate control voltages of the second sub-switches 212b and 214b that shunt the TDD paths to ground. For example, if one or more of the second sub-switches 212b and 214b is coupled to ground while the corresponding first sub-switches 212a and 214a remains connected to the antenna 124, the antenna 124 will also be connected to ground. During carrier aggregation, this results in the FDD band path (path C) being shunted to ground, which negatively affects EVM of the FDD band.

A delay on connecting the second sub-switches 212b and 214b to ground after disconnecting the corresponding first sub-switches 212a and 214a can reduce or prevent the antenna 124 and FDD band from being shunted to ground during communication over the FDD band.

The first, second, and third switches 212-216 may be designed to have a relatively large size and high number of stacks to meet stringent performance requirements for the transmit paths (e.g., paths B and C) such as minimum loss and high power-handling capabilities.

Figure 7:
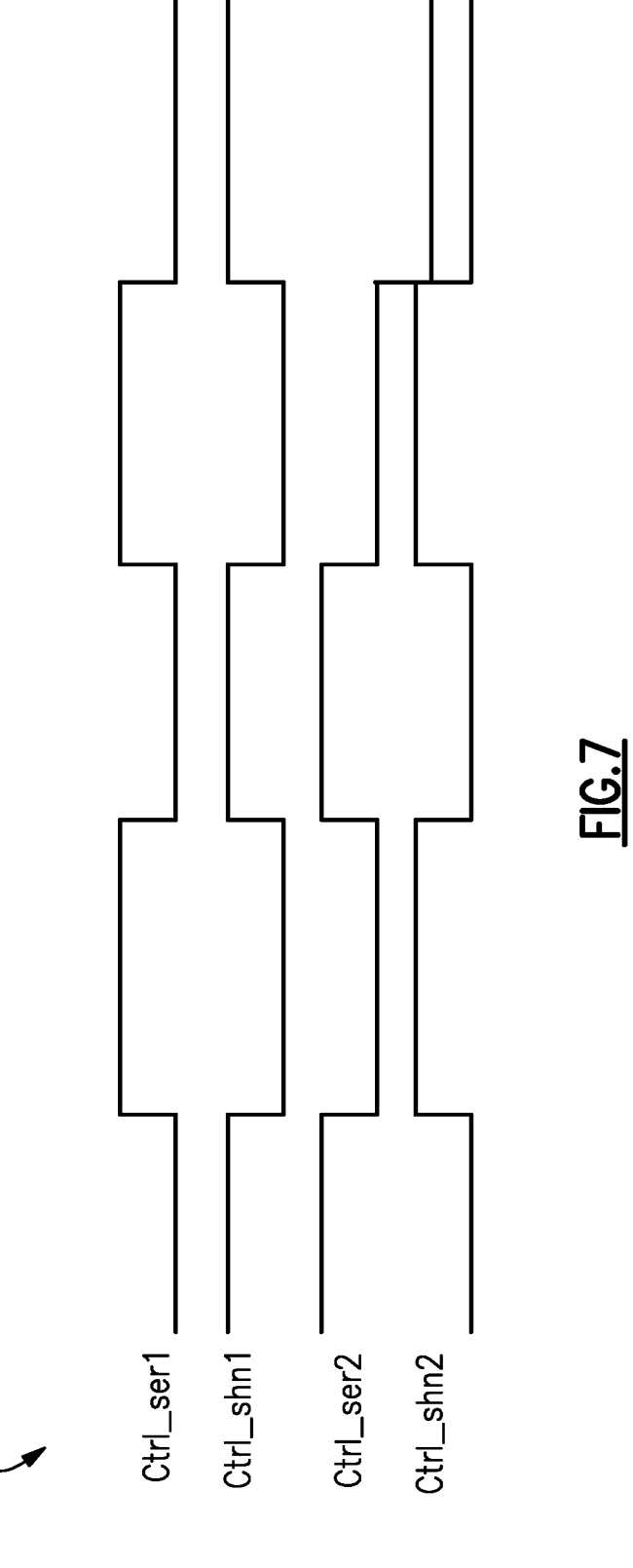
FIG. 7 illustrates example control signals provided to the first and second switches.

FIG. 7 illustrates example control signals 300 provided to the first and second switches 212 and 214. In particular, FIG.

7 illustrates an embodiment in which there is no delay between the switch control signals provided to the first and second switches 212 and 214. Referring to FIGS. 6 and 7, the first sub-switch 212a receives a first series control signal Ctrl_ser1 and the second sub-switch 212b receives a first shunt control signal Ctrl_shn1. Similarly, the second sub-switch 212a receives a second series control signal Ctrl_ser2 and the second sub-switch 212b receives a second shunt control signal Ctrl_shn2. Using the combination of control signals illustrated in FIG. 7, the shunt signals Ctrl_shn1 and Ctrl_shn2 have an off value when the corresponding series signals Ctrl_ser1 and Ctrl_ser2 have an on value, and vice-versa. In addition, the control signals are further configured to connect the antenna to one of the TDD transmit band terminal 102 and the TDD receive band terminal 106 at a time.

Figure 8:
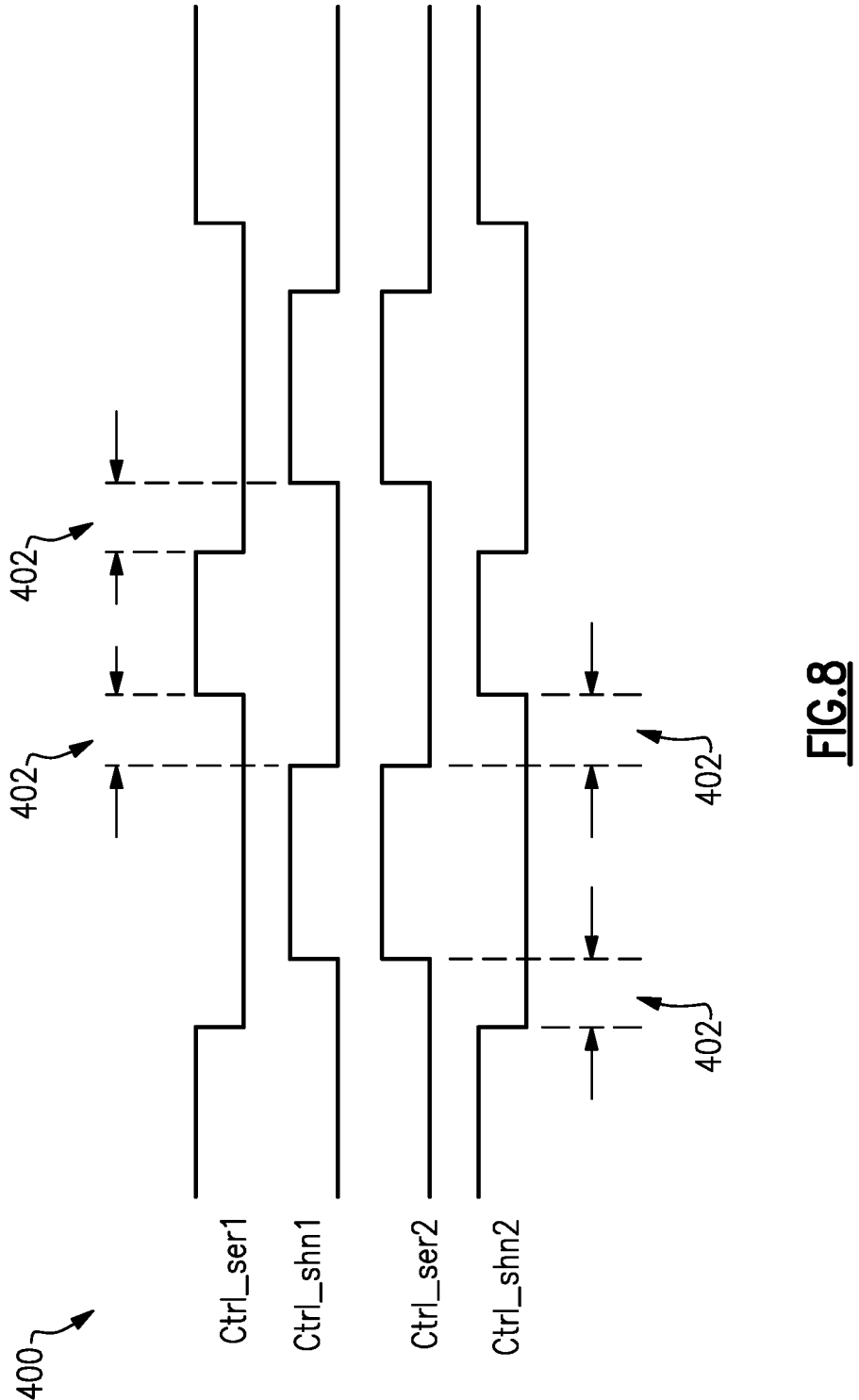
FIG. 8 illustrates example control signals provided to the first and second switches including a delay in accordance with aspects of this disclosure.

As discussed above, this "instantaneous" switching between series and shunt connections at the first and second switches 212 and 214 may result in EVM degradation on the FDD band path (path C). One way in which this EVM degradation can be addressed is to add a delay between the switching of the series and shunt sub-switches 212a, 212b, 214a, and 214 for each of the first and second switches. FIG. 8 illustrates example control signals 400 provided to the first and second switches 212 and 214 including a delay in accordance with aspects of this disclosure.

The dynamic on-resistance variation in the FDD receive path (path C) when TDD band transmit and receive paths (paths A and B) switch states can be suppressed by turning off the gate control signals of the second sub-switches 212b and 214b before turning on the series sub-switches 212a and 214a for the TDD transmit and receive paths (paths A and B). As shown in FIG. 8, there is a gap 402 between the transitions in the control signals Ctrl_ser1, Ctrl_shn1, Ctrl_ser2, and Ctrl_shn2. In particular, the gap 402 ensures that the FDD path (path C) is fully disconnected from the TDD transmit and receive paths (paths A and B) before the TDD transmit or receive band terminals 102 and 106 are shunted to ground.

In some implementations, the gap 402 can be accomplished by generating the gate control signals of the series (Ctrl_ser1 and Ctrl_ser2) and shunt (Ctrl_shn1 and Ctrl_shn2) switches so as to non-overlap as shown in FIG. 8. The suppressed disturbance on the on-resistance for the FDD path switch 216 at during the switching of switches 211 and 214 of the TDD transmit and receive paths (paths A and B) results in a significant improvement of EVM degradation. The increase in the amount of non-overlap in these control signals due to the gap 402 also results in an increase the switching delay time between transitioning between the TDD transmit and receive paths (paths A and B), which is another important specification in 5G system operation. Accordingly, in some implementations, the amount of non-overlap (e.g., the length of the gap 402) is programmable to allow the compromise between the EVM improvement and decrease of the switching delay to be tuned.

Figure 9:
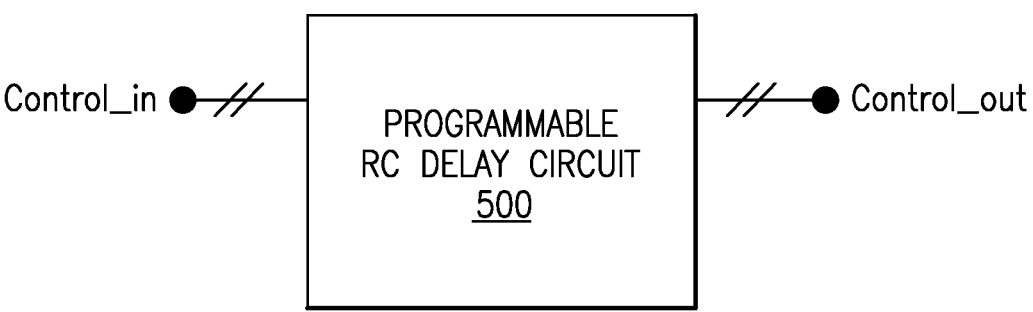
FIG. 9 is a block diagram of an example programmable RC delay circuit which may be included as a part of the hybrid delay control block of FIG. 6 in accordance with aspects of this disclosure.

In some embodiments, the amount of the delay (e.g., the length of the gap 402) can be programmed using a hybrid approach combining digital and analog RC circuitry. FIG. 9 is a block diagram of an example programmable RC delay circuit 500 which may be included as a part of the hybrid delay control block 202 of FIG. 6 in accordance with aspects of this disclosure. The RF delay circuit 500 is configured to receive a plurality of delay control signals Control_in and set the amount delay between switching of the control signals Ctrl_ser1, Ctrl_shn1, Ctrl_ser2, and Ctrl_shn2 by providing a plurality of output delay control signals Control_out. The programmable RC delay circuit 500 may include of digital and RC delay circuitry configured to adjust the amount of the delay between transitions in the control signals Ctrl_ser1, Ctrl_shn1, Ctrl_ser2, and Ctrl_shn2.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A wireless front end system comprising:
a first terminal coupled to a time-division duplexing transmit path, a second terminal coupled to a time-division duplexing receive path, a third terminal coupled to a frequency division duplexing path, and a fourth terminal coupled to an antenna;
a first switch configured to selectively connect the first terminal to either a first node or the fourth terminal based on a first control signal, a second switch configured to selectively connect the second terminal to either a second node or the fourth terminal based on a second control signal, and a third switch configured to connect the third terminal to the fourth terminal based on a third control signal; and
a controller configured to generate the first control signal, the second control signal, and the third control signal, and to provide: i) a first delay between switching connection of the first terminal from the fourth terminal to the first node, and ii) a second delay between switching connection of the second terminal from the fourth terminal to the second node.

2. The wireless front end system of claim 1 wherein the controller is further configured to adjust a length of the first delay and the second delay.

3. The wireless front end system of claim 1 wherein the controller includes both digital and analog circuitry configured to implement the first delay and the second delay.

4. The wireless front end system of claim 1 wherein the controller is further configured to switch between connecting the first terminal and the second terminal to the fourth terminal while the third terminal remains connected to the fourth terminal.

5. The wireless front end system of claim 1 wherein the first node and the second node are ground nodes.

6. The wireless front end system of claim 1 wherein the first switch includes a first serial sub-switch configured to selectively connect the first terminal to the fourth terminal and a first shunt sub-switch configured to selectively connect the first terminal to the first node, and the second switch includes a second serial sub-switch configured to selectively connect the second terminal to the fourth terminal and a second shunt sub-switch configured to selectively connect the second terminal to the second node.

7. The wireless front end system of claim 6 wherein the first control signal includes a first serial control signal configured to control the first serial sub-switch and a first shunt control signal configured to control the first shunt sub-switch, and the second control signal includes a second serial control signal configured to control the second serial sub-switch and a second shunt control signal configured to control the second shunt sub-switch.

8. A wireless front end system comprising:
a first terminal coupled to a time-division duplexing transmit path, a second terminal coupled to a time-division duplexing receive path, a third terminal coupled to a frequency division duplexing path, and a fourth terminal coupled to an antenna;
a first switch configured to selectively connect the first terminal to either a first node or the fourth terminal based on a first control signal, a second switch configured to selectively connect the second terminal to either a second node or the fourth terminal based on a second control signal, and a third switch configured to connect the third terminal to the fourth terminal based on a third control signal, the first switch including a first serial sub-switch configured to selectively connect the first terminal to the fourth terminal and a first shunt sub-switch configured to selectively connect the first terminal to the first node, and the second switch including a second serial sub-switch configured to selectively connect the second terminal to the fourth terminal and a second shunt sub-switch configured to selectively connect the second terminal to the second node.

9. The wireless front end system of claim 8 wherein the first control signal includes a first serial control signal configured to control the first serial sub-switch and a first shunt control signal configured to control the first shunt sub-switch, and the second control signal includes a second serial control signal configured to control the second serial sub-switch and a second shunt control signal configured to control the second shunt sub-switch.

10. The wireless front end system of claim 8 wherein the first node and the second node are ground nodes.

11. A mobile device comprising:
an antenna configured to transmit and receive radio frequency signals with a base station;
a time-division duplexing transmit amplifier;
a time-division duplexing receive amplifier;
a frequency division duplexing terminal coupled to a frequency division duplexing path; and
a front end system coupled to the antenna, the time-division duplexing transmit amplifier, the time-division duplexing receive amplifier, and the frequency division duplexing terminal, the front end system including a first switch configured to selectively connect the time-division duplexing transmit amplifier to either a first node or the antenna based on a first control signal, a second switch configured to selectively connect the time-division duplexing receive amplifier to either a second node or the antenna based on a second control signal, a third switch configured to connect the frequency division duplexing terminal to the antenna based on a third control signal, and a controller configured to generate the first control signal, the second control signal, and the third control signal, and to provide: i) a first delay between switching connection of the time-division duplexing transmit amplifier from the antenna to the first node, and ii) a second delay between switching connection of the time-division duplexing receive amplifier from the antenna to the second node.

12. The mobile device of claim 11 wherein the controller is further configured to adjust a length of the first delay and the second delay.

13. The mobile device of claim 11 wherein the controller includes both digital and analog circuitry configured to implement the first delay and the second delay.

14. The mobile device of claim 11 wherein the controller is further configured to switch between connecting the time-division duplexing transmit amplifier and the time-division duplexing receive amplifier to the antenna while the frequency division duplexing terminal remains connected to the antenna.

15. The mobile device of claim 11 wherein the first node and the second node are ground nodes.

16. The mobile device of claim 11 wherein the first switch includes a first serial sub-switch configured to selectively connect the time-division duplexing transmit amplifier to the antenna and a first shunt sub-switch configured to selectively connect the time-division duplexing transmit amplifier to the first node, and the second switch includes a second serial sub-switch configured to selectively connect the time-division duplexing receive amplifier to the antenna and a second shunt sub-switch configured to selectively connect the time-division duplexing receive amplifier to the second node.

17. The mobile device of claim 16 wherein the first control signal includes a first serial control signal configured to control the first serial sub-switch and a first shunt control signal configured to control the first shunt sub-switch, and the second control signal includes a second serial control signal configured to control the second serial sub-switch and a second shunt control signal configured to control the second shunt sub-switch.

18. A mobile device comprising:

an antenna configured to transmit and receive radio frequency signals with a base station;

a time-division duplexing transmit amplifier;

a time-division duplexing receive amplifier;

a frequency division duplexing terminal coupled to a frequency division duplexing path; and a front end system coupled to the antenna, the time-division duplexing transmit amplifier, the time-division duplexing receive amplifier, and the frequency division duplexing terminal, the front end system including a first switch configured to selectively connect the time-division duplexing transmit amplifier to either a first node or the antenna based on a first control signal, a second switch configured to selectively connect the time-division duplexing receive amplifier to either a second node or the antenna based on a second control signal, and a third switch configured to connect the frequency division duplexing terminal to the antenna based on a third control signal, the first switch including a first serial sub-switch configured to selectively connect the time-division duplexing transmit amplifier to the antenna and a first shunt sub-switch configured to selectively connect the time-division duplexing transmit amplifier to the first node, and the second switch including a second serial sub-switch configured to selectively connect the time-division duplexing receive amplifier to the antenna and a second shunt sub-switch configured to selectively connect the time-division duplexing receive amplifier to the second node.

19. The mobile device of claim 18 wherein the first control signal includes a first serial control signal configured to control the first serial sub-switch and a first shunt control signal configured to control the first shunt sub-switch, and the second control signal includes a second serial control signal configured to control the second serial sub-switch and a second shunt control signal configured to control the second shunt sub-switch.

20. The mobile device of claim 18 wherein the first node and the second node are ground nodes.

* * * * *